E. A. POHLMAN & R. NETTER.
COMPRESSION VALVE.
APPLICATION FILED JAN. 2, 1915.
1,186,829.
Patented June 13, 1916.
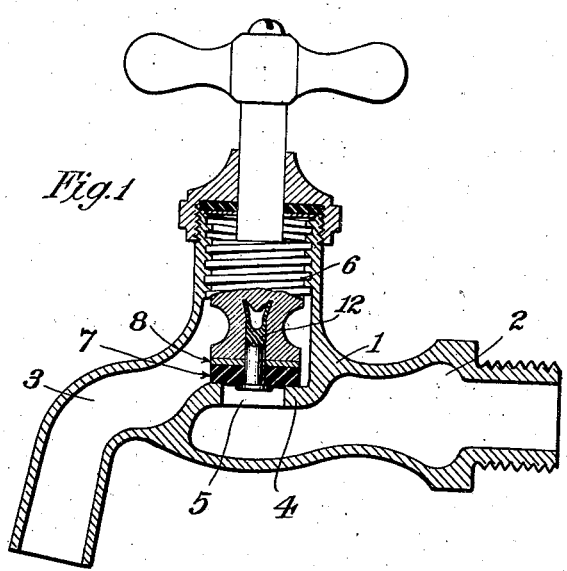
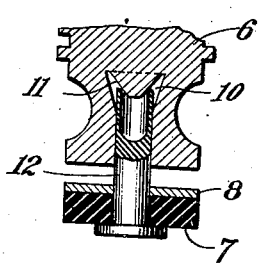
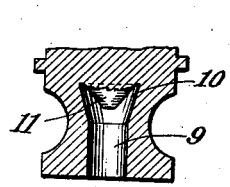
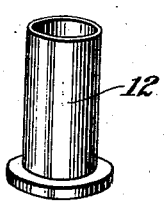
Witnesses:
C. D. Morrill,
Chas. Roberts.
Edward A. Pohlman
and Raphaël Netter, Inventors,
By their Attorney

UNITED STATES PATENT OFFICE.

EDWARD A. POHLMAN AND RAPHAËL NETTER, OF NEW YORK, N. Y.

COMPRESSION-VALVE.

1,186,829.  Specification of Letters Patent.  Patented June 13, 1916.

Application filed January 2, 1915. Serial No. 19.

*To all whom it may concern:*

Be it known that we, EDWARD A. POHLMAN, a citizen of the United States, and RAPHAËL NETTER, a citizen of the Republic of France, both residents of the city of New York, county and State of New York, have invented new and useful Improvements in Compression-Valves, of which the following is a specification.

This invention relates to compression valves or faucets in which the valve port is closed by a fiber or rubber gasket carried by a threaded valve body which is compressed against the port, and the particular object of the invention is to provide an improved means for fastening such gasket to the face of the valve body. Heretofore the common practice has been to attach such gasket by means of a central screw threaded into the bottom of the valve body. Such attachments are open to several objections, chiefly the difficulty of removal for replacing the gasket as the screw frequently becomes set from corrosion and the tendency of the screw to be turned on its thread by the operation of the valve. As the screw must be made of brass, if set too hard its head will be broken off by the screw driver and thus make its removal very difficult. On the other hand the screw is sometimes loosened by the turning of the valve allowing the gasket to drop off.

By our improved fastening means the above objectionable features are completely eliminated and the gasket may be removed without difficulty, no matter how long it has been since it was applied, and a new gasket may be replaced in a few seconds' time without tools of any kind. Further our improved fastening means permits of slight rotation of the gasket upon the end of the valve body so that as the gasket is compressed against the port, it may remain stationary while the valve body is given a final twist to make a tight closure without tearing or wearing the face of the gasket against the port.

In the accompanying drawing we have illustrated our invention as applied to an ordinary faucet such as used in household installations, and in said drawings Figure 1 shows such faucet in cross section, and Figs. 2, 3, and 4 are detail views of the fastening devices on an enlarged scale.

Referring now to the drawings, the numeral 1 indicates the faucet proper having the usual inlet chamber 2 to be directly connected to the supply pipe and the outlet chamber 3 separated from the chamber 2 by the web 4 containing the port 5. The valve body 6 is threaded in the upper portion of the faucet in the usual manner so that its end will come against the upper face of the web 4 and compress the gasket 7 between the web and the valve body. Between the gasket and the valve body we preferably provide a metal washer 8 so that there will be less resistance to rotation between the washer and the valve body than between the gasket and either the washer or the web.

The gasket and washer are provided with central holes which register with a hole 9 drilled in the bottom of the valve body and undercut at its end as indicated at 10 in Fig. 3. The bottom of the hole is formed with a conical projection 11 of larger diameter at the base than the bore of the main portion of the hole. The gasket and washer are fastened to the valve body by means of the fastener 12 of the design shown in Figs. 2 and 4 comprising a copper or soft brass rivet having a smooth cylindrical side wall and bored out at its end to a depth somewhat greater than the flaring portion of the hole 9. The head of the rivet is of sufficient extent to hold the gasket in place and the length of the body of the rivet is such that when it is driven into the hole 9 its end will reach the bottom of the hole before the gasket is materially compressed by the head so that the gasket can turn on the rivet without being damaged.

To apply the gasket to the valve body it is merely necessary to insert the rivet in the central hole of the gasket and drive it home with a light hammer. The bored end of the rivet will come against the projection 11 and be expanded into the undercut or flared portion of the hole 9 and hold the fastener in place. As rotation of the fastener tends to neither tighten nor loosen it it is immaterial whether the gasket binds on the stem or not. When the gasket becomes worn the rivet may be readily withdrawn by a pair of pliers or by means of a claw, as the metal may be quite soft and still give sufficient hold for all practical purposes. In drawing through the bore 9 the fastener will be reshaped to its original form and may be used again if a new fastener is not available.

Our improved fastener may be used for other purposes than fastening gaskets to valve bodies although especially designed for such use, and our invention is to be understood as in no wise limited to such use.

Having thus described our invention what we claim and desire to secure by Letters Patent is:

1. In a compression valve the combination of a valve fixture having two passages separated by a perforated web, a valve body threaded in said fixture to move toward and from said web and having its end face parallel with the adjacent face of said web, said valve body having a centrally located longitudinal bore enlarged at its inner end with a conical projection extending into said enlarged portion, a compression gasket on the end of said valve body adapted to be compressed between the valve body and the adjacent face of the web to close the valve, said gasket having a hole registering with the bore of said valve body and a fastener consisting of a tubular stem projecting through said hole into the bore with its end expanded by said projection in said bore, said fastener having a head engaging the end face of the gasket.

2. In a compression valve the combination of a valve fixture having two passages separated by a perforated web, a valve body threaded in said fixture to move toward and from said web and having its end face parallel with the adjacent face of said web, said valve body having a centrally located longitudinal bore enlarged at its inner end with a conical projection extending into said enlarged portion, a compression gasket on the end of said valve body adapted to be compressed between the valve body and the adjacent face of the web to close the valve, said gasket having a hole registering with the bore of said valve body and a fastener consisting of a tubular stem projecting through said hole into the bore with its end expanded by said projection in said bore, said fastener having a head engaging the end face of the gasket, and being of a length to engage the bottom of the bore before its head compresses the gasket sufficiently to prevent relative rotation of the valve body and gasket.

Signed at New York, in the county of New York and State of New York, this 31st day of December, 1914.

EDWARD A. POHLMAN.
RAPHAEL NETTER.

Witnesses:
HOWARD H. COLE,
W. B. MORTON.